(12) United States Patent
Gupta et al.

(10) Patent No.: US 10,244,366 B2
(45) Date of Patent: *Mar. 26, 2019

(54) MESSAGING FORMAT CONVERSION FOR A CELLULAR NETWORK

(71) Applicant: Verizon Patent and Licensing Inc., Arlington, VA (US)

(72) Inventors: Praveen Gupta, Dublin, CA (US); Kevin Lim, Danville, CA (US); Priscilla Lau, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/885,460

(22) Filed: Jan. 31, 2018

(65) Prior Publication Data
US 2018/0160279 A1 Jun. 7, 2018

Related U.S. Application Data

(63) Continuation of application No. 15/216,451, filed on Jul. 21, 2016.

(51) Int. Cl.
| | |
|---|---|
| H04W 4/00 | (2018.01) |
| H04W 4/14 | (2009.01) |
| H04L 12/707 | (2013.01) |
| H04M 1/725 | (2006.01) |

(52) U.S. Cl.
CPC ............... *H04W 4/14* (2013.01); *H04L 45/22* (2013.01); *H04M 1/72552* (2013.01)

(58) Field of Classification Search
CPC ........ H04W 4/12; H04W 4/14; H04W 88/184
USPC ........................... 455/466, 415.2, 567, 414.2
See application file for complete search history.

(56) References Cited

U.S. PATENT DOCUMENTS

| | | |
|---|---|---|
| 2011/0319075 A1 | 12/2011 | Sharma |
| 2014/0106728 A1 | 4/2014 | Aboulhosn |
| 2015/0105110 A1 | 4/2015 | Tuttle |
| 2015/0296353 A1 | 10/2015 | Meyer |
| 2016/0344581 A9 | 11/2016 | Karmarkar |

*Primary Examiner* — Temica M Beamer

(57) ABSTRACT

A network device may receive, from a sending device, a message in a first messaging format en route to user equipment. The first messaging format may correspond to one of a 3GPP cellular network standard or a 3GPP2 cellular network standard. The network device may determine whether the user equipment is associated with the first messaging format or with a second messaging format. The second messaging format may correspond to one of the 3GPP cellular network standard or the 3GPP2 cellular network standard. The first messaging format and the second messaging format may be associated with different cellular network standards. The device may selectively provide the message in the first messaging format or the second messaging format based on whether the user equipment is associated with the first messaging format or the second messaging format. The device may transmit an acknowledgment message based on the first messaging format.

20 Claims, 11 Drawing Sheets

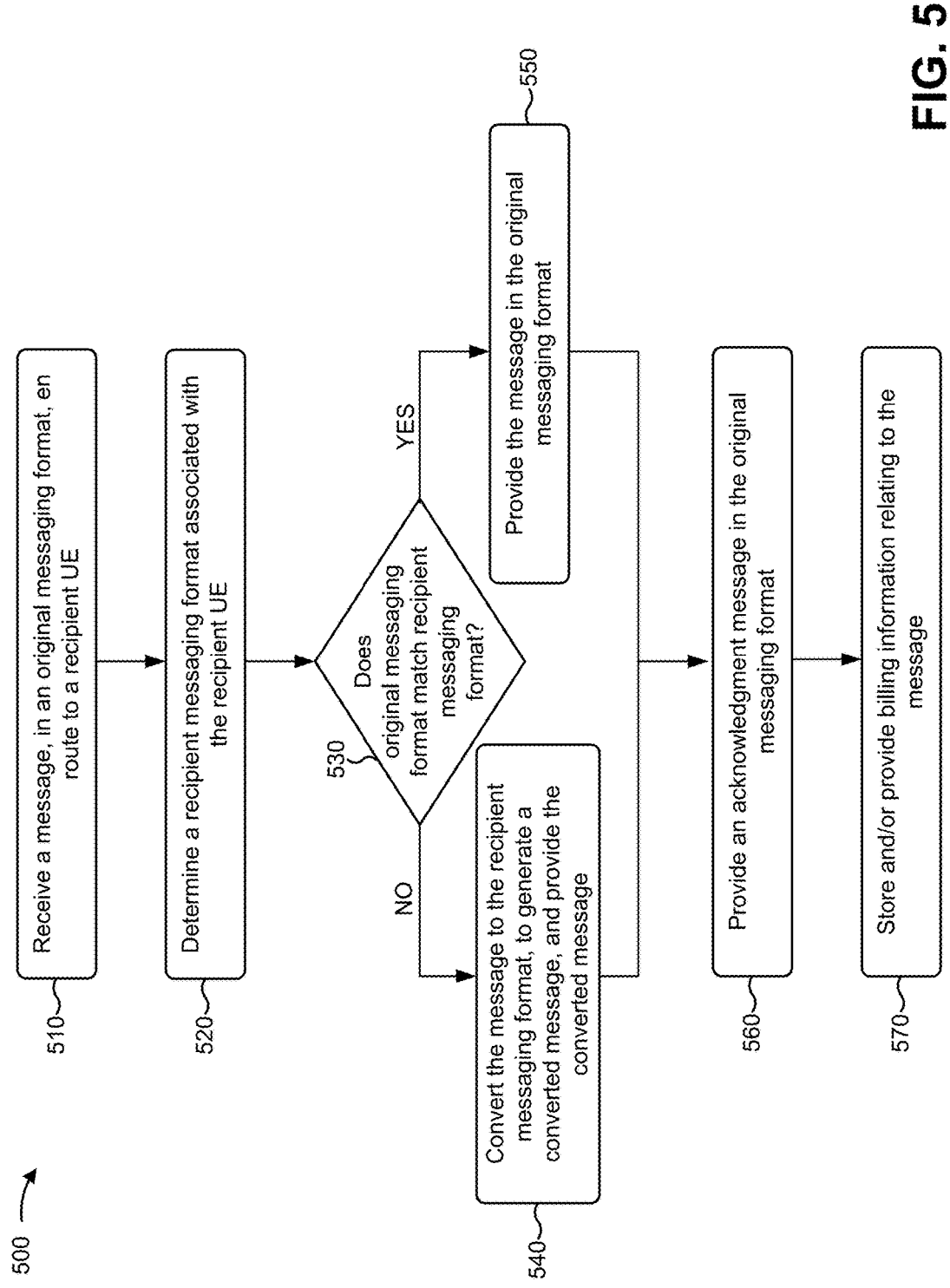

MESSAGING FORMAT CONVERSION FOR A CELLULAR NETWORK

RELATED APPLICATION

This application is a continuation of U.S. patent application Ser. No. 15/216,451, filed Jul. 21, 2016, which is incorporated herein by reference.

BACKGROUND

Wireless networks, such as cellular networks, may operate based on different standards and network technologies. For example, one wireless network (e.g., a Global System for Mobile Communications (GSM) network) may operate based on a $3^{rd}$ Generation Partnership Project (3GPP) standard. Another wireless network (e.g., a Code Division Multiple Access (CDMA) network) may operate based on the $3^{rd}$ Generation Partnership Project 2 (3GPP2) standard. Some wireless networks may implement both the 3GPP and 3GPP2 standards (e.g., to support the operations of CDMA and non-CDMA user devices). Based on which standard the wireless network uses, communications may be routed via different devices and using different formats and/or encoding schemes.

BRIEF DESCRIPTION OF THE DRAWINGS

FIG. 5 is a flow chart of an example process for routing and/or converting messages between sending user equipment and recipient user equipment based on respective messaging formats associated with the sending and recipient user equipment;

DETAILED DESCRIPTION OF PREFERRED EMBODIMENTS

Figure 1A:
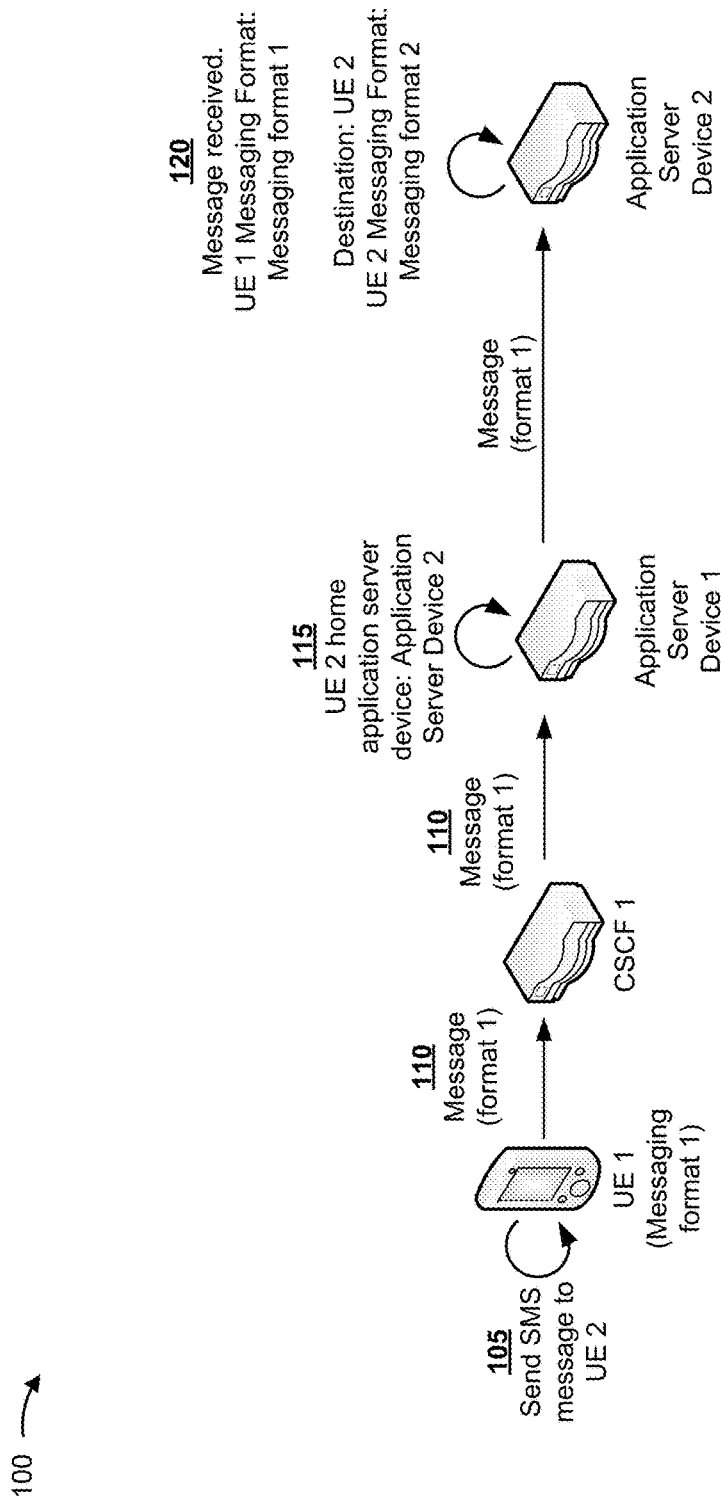
FIGS. 1A and 1B are diagrams of an overview of an example implementation described herein.

The following detailed description of example implementations refers to the accompanying drawings. The same reference numbers in different drawings may identify the same or similar elements.

A wireless network, such as a cellular network, facilitates the sending and receiving of messages (e.g., Short Message Service (SMS) messages, Multimedia Message Service (MMS) messages, short form messages, or the like) between user devices (e.g., user equipment (UE), such as mobile phones, tablets, etc.). Different UEs may be associated with different types of messaging formats and may utilize different standards and encoding techniques for sending and receiving messages. For example, a UE that operates on a non-CDMA network (e.g., based on 3GPP standards) may use different encoding techniques than a UE that operates on a CDMA network (e.g., based on 3GPP2 standards). Further, UEs using 3GPP and 3GPP2 standards may use different communication protocols to communicate (e.g., session initiation protocol (SIP), signaling system no. 7 (SS7), GSM-Mobile Application Part (MAP), etc.).

When 3GPP and 3GPP2 UEs co-exist in a wireless network, or are communicating via wireless networks that use different standards, some features, such as acknowledgment messages and/or delivery receipts, may not work properly when an SMS message is delivered from one UE to another, and when the UEs are associated with different standards. Further, UEs operating based on different standards may use different architectures, interfaces, or sets of devices to route messages, adding to complexity of the wireless network.

Implementations described herein may use an application server device, associated with a recipient UE, to convert between messaging formats (e.g., based on 3GPP standards, 3GPP2 standards, or other standards) associated with a sending UE and with the recipient UE. In some implementations, acknowledgment messages may also be converted appropriately between messaging formats by the application server device associated with the recipient UE.

Furthermore, implementations described herein permit the application server device to communicate with application server devices of other cellular networks via a SIP over IP interface or protocol, irrespective of whether a cellular network associated with the application server device is a 3GPP cellular network or a 3GPP2 cellular network. For example, the application server device may include an application processor of an IP Multimedia Subsystem (IMS) core, and the application server device may communicate with other application server devices (i.e., other application processors) associated with other IMS cores based on a SIP over IP interface.

In this way, a standard architecture of sending application server devices and recipient application server devices may handle messages between 3GPP UEs and 3GPP2 UEs, thus simplifying network implementation, reducing complexity of network architecture, and standardizing the interfaces used between network elements irrespective of the messaging format associated with the recipient UE.

In some implementations, billing information for a recipient UE can be stored and/or provided by the recipient application server device irrespective of standards with which the sending and recipient UEs are associated, thus simplifying billing of the sending UE and/or the recipient UE.

As used herein, a 3GPP standard or messaging format refers to a standard or messaging format promulgated by the 3GPP standards body. For example, a 3GPP standard or messaging format may refer to a GSM standard, a Universal Mobile Telecommunications System (UMTS) standard, a General Packet Radio Service (GPRS) standard, an Enhanced Data Rates for GSM Evolution (EDGE) standard, a High Speed Packet Access (HSPA) standard, a Long Term Evolution (LTE) standard, or the like. As used herein, a 3GPP2 standard or messaging format refers to a standard or messaging format promulgated by the 3GPP2 standards body, such as a CDMA2000 standard, a cdmaOne standard, or another CDMA standard. Furthermore, as used herein, "3GPP standard" and "3GPP messaging format" are interchangeable with any of a GSM standard, a UMTS standard, a GPRS standard, an EDGE standard, an HSPA standard, or an LTE standard. Still further, as used herein, "3GPP2 standard" and "3GPP2 messaging format" are interchangeable with any of a CDMA2000 standard or a cdmaOne standard.

While implementations described herein are described in the context of 3GPP standards and 3GPP2 standards, implementations described herein are not intended to be limited to 3GPP standards and 3GPP2 standards. Indeed, implementations described herein may be applied to standards and/or messaging formats other than 3GPP or 3GPP2 standards and/or messaging formats, such as other standards that are currently available or standards that have not yet been developed or implemented.

Figure 1B:
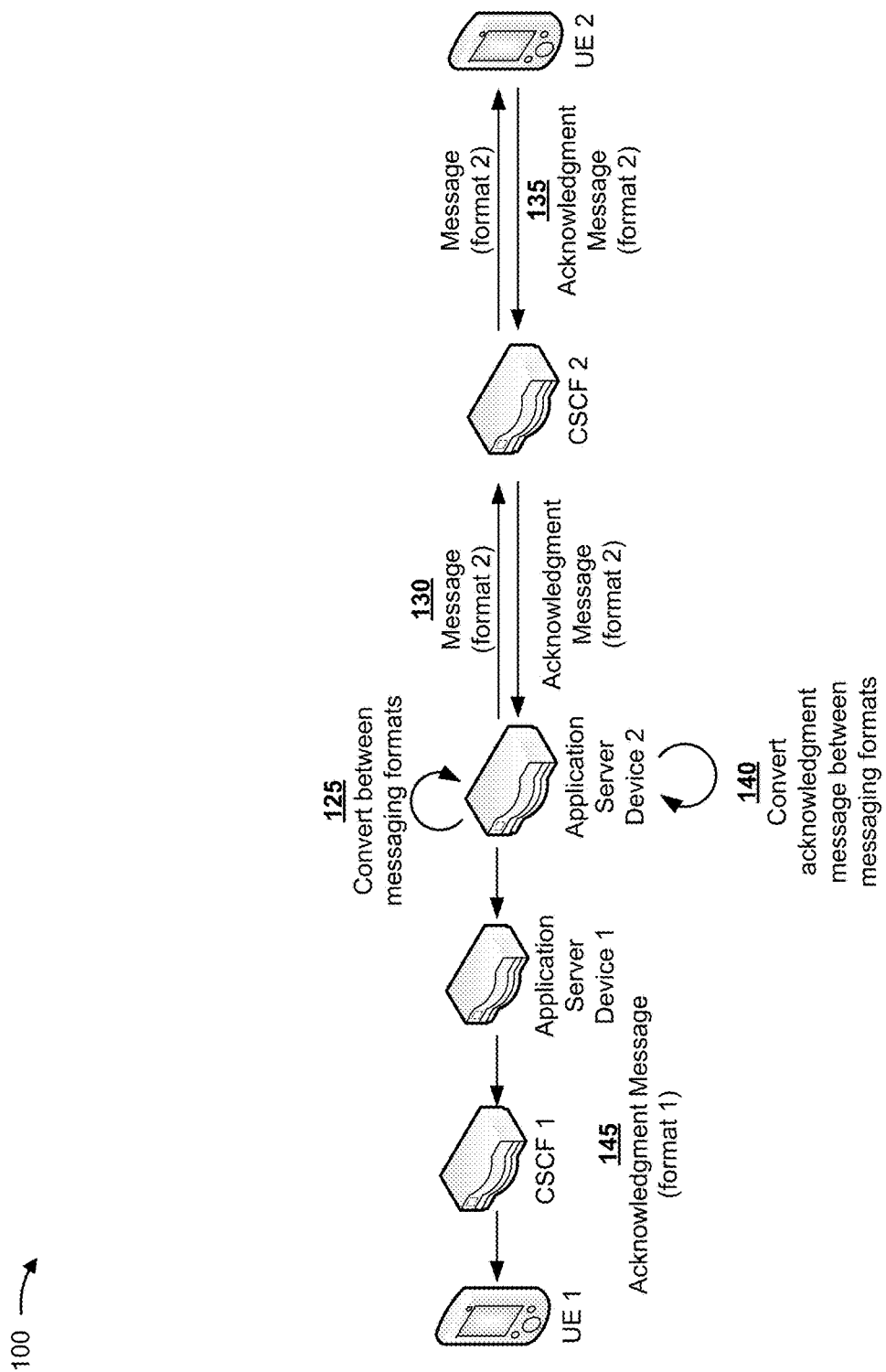

FIGS. 1A and 1B are diagrams of an overview of an example implementation 100 described herein. As shown by reference number 105 in FIG. 1A, a sending UE (e.g., UE 1) may send a message (e.g., an SMS message, an MMS message, a short form message, etc.) to a receiving UE (e.g., UE 2, not shown in FIG. 1A) in an original messaging format (e.g., in messaging format 1). As described herein, the original messaging format may be a 3GPP or 3GPP2 messaging format that complies with the encoding standards of the 3GPP or 3GPP2 standards. As shown by reference number 110, the message may be transmitted to a home application server device associated with UE 1 (e.g., application server device 1). As further shown, in some cases, the message may be transmitted to application server device 1 via a call service control function (CSCF) device associated with UE 1. In other cases, the message may not be transmitted via the CSCF device (e.g., based on the original messaging format).

In some implementations, UE 1 and UE 2 may be associated with different home application server devices. In some implementations, UE 1 and UE 2 may be associated with the same home application server device. The home application server device may be based on a device identifier of the corresponding UE and may be assigned when the corresponding UE is provisioned by the network.

As shown by reference number 115, application server device 1 may provide the message, in messaging format 1, to a home application server device of UE 2 (e.g., application server device 2). As shown by reference number 120, application server device 2 may receive the message, and may determine that the message is associated with messaging format 1. Further, application server device 2 may determine that the destination for the message is UE 2, and that the messaging format associated with UE 2 is messaging format 2.

FIG. 1B continues the example implementation shown in FIG. 1A. As shown in FIG. 1B, and by reference number 125, application server device 2 may convert between the messaging formats (e.g., based on determining that messaging format of UE 2 is different than the messaging format of the message). For example, application server device 2 may convert the message from messaging format 1 to messaging format 2. As shown by reference number 130, application server device 2 may provide the message (in messaging format 2) to UE 2 (e.g., via CSCF device 2 associated with UE 2).

As shown by reference number 135, UE 2 may provide an acknowledgment message (Message Ack) in messaging format 2 to application server device 2 (e.g., via CSCF device 2). In some implementations, the acknowledgment message may include a SIP 200 OK message, an RP-ACK message, or the like. As shown by reference number 140, application server device 2 may convert the acknowledgment message to messaging format 1 based on UE 1 being associated with messaging format 1. As shown by reference number 145, application server device 2 may provide the acknowledgment message, in messaging format 1, to UE 1 (e.g., via application server device 1 and/or CSCF device 1, based on the original messaging format of the message). For example, application server device 2 may provide the acknowledgment message to application server device 1, and application server device 1 may forward the acknowledgment message to UE 1.

In some implementations, application server device 2 may convert the acknowledgment message to the original messaging format of the message sent by UE 1 (e.g., messaging format 1). In some implementations, application server device 2 may provide the acknowledgment message in the messaging format associated with UE 2 (e.g., messaging format 2), and application server device 1 may convert the acknowledgment message to the messaging format associated with UE 1 (e.g., messaging format 1).

In some implementations, (e.g., when application server device 1 is associated with a 3GPP messaging format), application server device 2 may provide a time stamp, a submission time, or the like. The time stamp may identify a time at which the SMS message was generated or transmitted by UE 1, and may permit application server device 1 to determine that the acknowledgment message is associated with the SMS message and/or UE 1. In this way, application server device 2 facilitates messaging between UEs irrespective of the messaging formats associated with the UEs.

In this way, a standard architecture may be used to facilitate the sending and receiving of messages between 3GPP (e.g., non-CDMA) UEs and 3GPP2 (e.g., CDMA) UEs, thus simplifying network implementation, reducing complexity of network architecture, and standardizing the interfaces used between network elements irrespective of the messaging format associated with the sending UE and the recipient UE.

As indicated above, FIGS. 1A and 1B are provided merely as examples. Other examples are possible and may differ from what was described with regard to FIGS. 1A and 1B.

Figure 2:
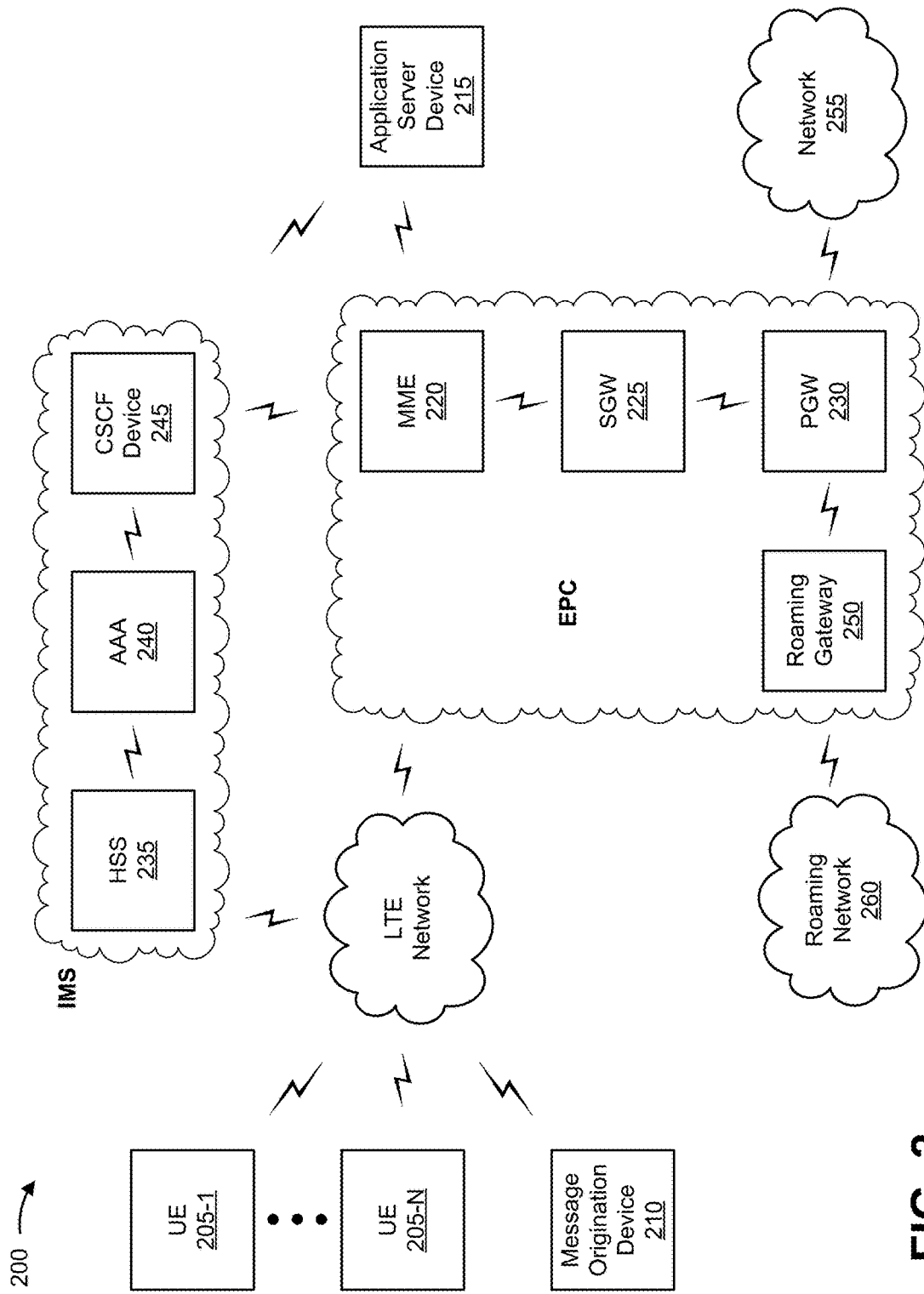
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user equipment (UEs) 205-1 through 205-N (N≥1) (hereinafter referred to collectively as "UEs 205," and individually as "UE 205"), a message origination device 210, an application server device 215, a mobility management entity device (MME) 220, a serving gateway (SGW) 225, a packet data network gateway (PGW) 230, a home subscriber server (HSS) 235, an authentication, authorization, and accounting server (AAA) 240, a call session control function (CSCF) device 245, a roaming gateway 250, a network 255, and a roaming network 260. Devices of environment 200 may interconnect via wired connections, wireless connections, or a combination of wired and wireless connections.

Some implementations are described herein as being performed within a long-term evolution (LTE) network for explanatory purposes. Some implementations may be performed within a network that is not an LTE network, such as a third generation (3G) network. Also, some implementations may be performed by network devices of a network that is associated with a 3GPP wireless communication standard and/or a 3GPP2 wireless communication standard.

Environment 200 may include an evolved packet system (EPS) that includes an LTE network and/or an evolved packet core (EPC) that operate based on a 3GPP wireless communication standard and/or a 3GPP2 wireless communication standard. The LTE network may include a radio access network (RAN) that includes one or more base stations that take the form of evolved Node Bs (eNBs) via which UE 205 communicates with the EPC. The EPC may include MME 220, SGW 225, and/or PGW 230 that enable UE 205 to communicate with network 255 and/or an Internet protocol (IP) multimedia subsystem (IMS) core. The IMS core may include HSS 235 and/or AAA 240, and may manage device registration and authentication, session initiation, etc., associated with UEs 205. HSS 235 and/or AAA 240 may reside in the EPC and/or the IMS core.

UE 205 includes one or more devices capable of receiving, generating, storing, processing, and/or providing messages. For example, UE 205 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Message origination device 210 includes a device that generates and/or provides a message (e.g., an SMS message, a MMS message, a short form message, or the like). For example, message origination device 210 may include a server device, a group of server devices, or the like. In some implementations, message origination device 210 may host an application that generates or receives a message.

Application server device 215 includes a device (e.g., a cellular network device) that receives, stores, processes, routes, and/or provides messages en route to or from UE 205 or message origination device 210. For example, application server device 215 may include a server, a group of servers, an SMS center (SMSC), a gateway, a router, an over-the-top (OTT) messaging server, an IMS application processor, or the like. As described herein, different UEs 205 may be associated with different application server devices 215. For example, one application server device 215 may serve UEs 205 located in a first geographical area, and another application server device 215 may serve UEs 205 located in a second geographical area.

Application server device 215 may be capable of communicating with another device (e.g., UE 205, message origination device 210, another application server device 215, roaming gateway 250, etc.) based on a SIP interface (e.g., when the other device is associated with a 3GPP messaging format or cellular network standard) and based on an SS7 interface (e.g., when the other device, and a UE 205 associated with application server device 215), are associated with a 3GPP2 messaging format or cellular network standard).

MME 220 includes one or more devices, such as one or more server devices, capable of managing authentication, activation, deactivation, and/or mobility functions associated with UE 205. In some implementations, MME 220 may perform operations relating to authentication of UE 205. Additionally, or alternatively, MME 220 may facilitate the selection of a particular SGW 225 and/or a particular PGW 230 to serve traffic to and/or from UE 205. MME 220 may perform operations associated with handing off UE 205 from a first base station to a second base station when UE 205 is transitioning from a first cell associated with the first base station to a second cell associated with the second base station. Additionally, or alternatively, MME 220 may select another MME (not pictured), to which UE 205 should be handed off (e.g., when UE 205 moves out of range of MME 220).

SGW 225 includes one or more devices capable of routing packets. For example, SGW 225 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 225 may aggregate traffic received from one or more base stations associated with a cellular network (e.g., an LTE network), and may send the aggregated traffic to network 255 (e.g., via PGW 230) and/or other network devices associated with the EPC and/or the IMS core. SGW 225 may also receive traffic from network 255 and/or other network devices, and may send the received traffic to UE 205 via a base station. Additionally, or alternatively, SGW 225 may perform operations associated with handing off UE 205 to and/or from an LTE network.

PGW 230 includes one or more devices capable of providing connectivity for UE 205 to external packet data networks (e.g., other than the depicted EPC and/or LTE network). For example, PGW 230 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 230 may aggregate traffic received from one or more SGWs 225, and may send the aggregated traffic to network 255. Additionally, or alternatively, PGW 230 may receive traffic from network 255, and may send the traffic to UE 205 via SGW 225 and a base station. PGW 230 may record data usage information (e.g., byte usage), and may provide the data usage information to AAA 240.

HSS 235 includes one or more devices, such as one or more server devices, capable of managing (e.g., receiving, generating, storing, processing, and/or providing) information associated with UE 205. For example, HSS 235 may manage subscription information associated with UE 205, such as information that identifies a subscriber profile of a user associated with UE 205, information that identifies services and/or applications that are accessible to UE 205, location information associated with UE 205, a network identifier (e.g., a network address) that identifies UE 205, information that identifies a treatment of UE 205 (e.g., quality of service information, a quantity of minutes allowed per time period, a quantity of data consumption allowed per time period, etc.), and/or similar information. HSS 235 may provide this information to one or more other devices of environment 200 to support the operations performed by those devices. In some implementations, HSS 235 may include a home location register.

AAA 240 includes one or more devices, such as one or more server devices, that perform authentication, authorization, and/or accounting operations for communication sessions associated with UE 205. For example, AAA 240 may perform authentication operations for UE 205 and/or a user of UE 205 (e.g., using one or more credentials), may control access, by UE 205, to a service and/or an application (e.g., based on one or more restrictions, such as time-of-day restrictions, location restrictions, single or multiple access restrictions, read/write restrictions, etc.), may track resources consumed by UE 205 (e.g., a quantity of voice minutes consumed, a quantity of data consumed, etc.), and/or may perform similar operations.

CSCF device 245 includes one or more computing devices, such as a server device or a collection of server devices. In some implementations, CSCF device 245 may process and/or route calls to and from UE 205 via the EPC. For example, CSCF device 245 may process calls and/or messages, received from network 255, that are destined for UE 205. Additionally or alternatively, CSCF device 245 may process calls and/or messages, received from UE 205, that are destined for network 255. In some implementations, CSCF device 245 may include a telephony application server (TAS), a provisioning-CSCF (P-CSCF), an interrogating-CSCF (I-CSCF), and/or a serving-CSCF (S-CSCF).

Roaming gateway 250 includes one or more devices capable of receiving, processing, routing, and/or providing messages en route to and/or from roaming network 260, which may be associated with another network provider or cellular network standard. For example, roaming gateway 250 may include one or more data processing and/or traffic transfer devices, such as a gateway, a router, a modem, a switch, a firewall, a NIC, a hub, a bridge, a server device, an OADM, or any other type of device that processes and/or transfers traffic.

Network 255 may include one or more wired and/or wireless networks. For example, network 255 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

Roaming network 260 may include one or more wired and/or wireless networks. For example, roaming network 260 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks. Roaming network 260 may be associated with a different standard and/or messaging format than the cellular network described above.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
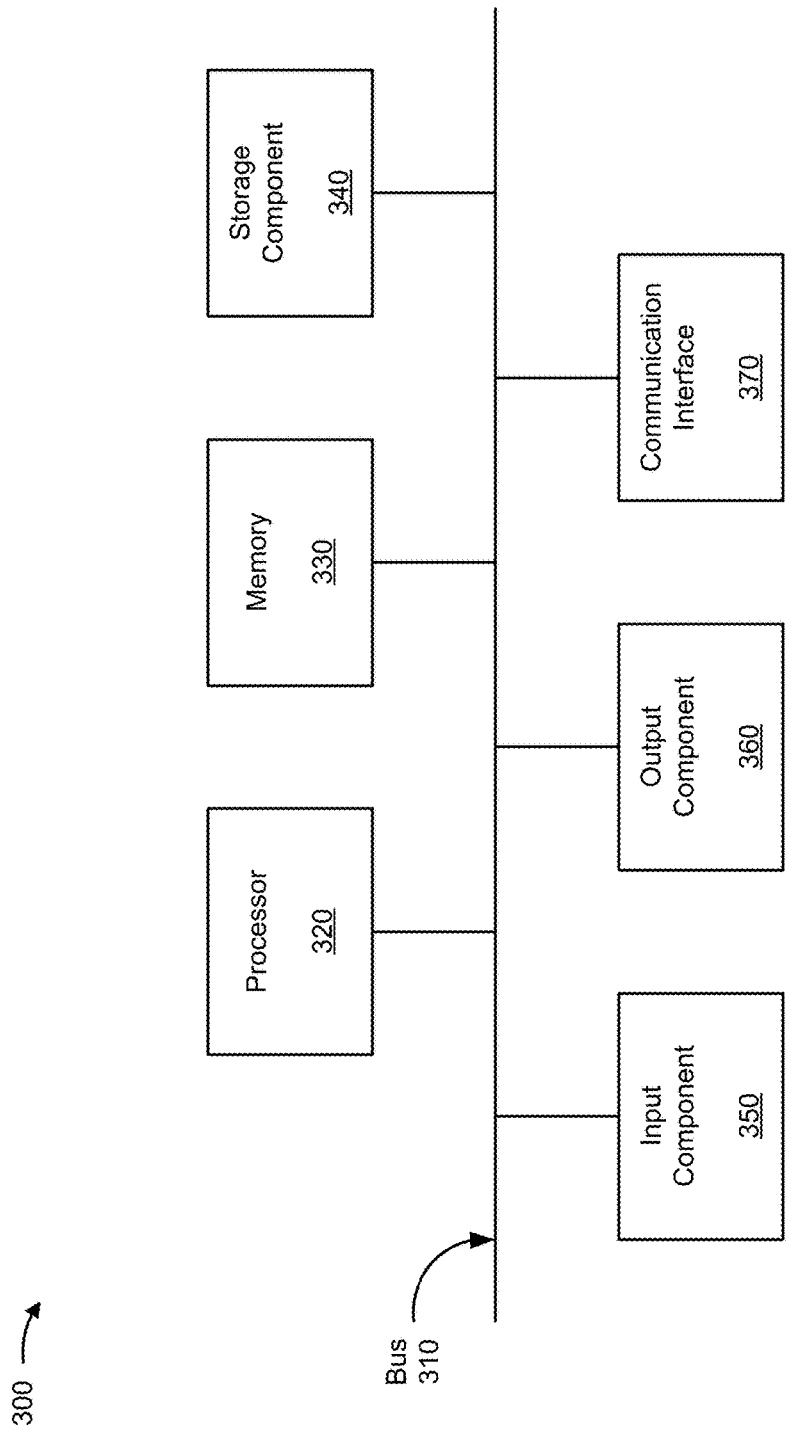
FIG. 3 is a diagram of example components of one or more devices of FIG. 2.

FIG. 3 is a diagram of example components of a device 300. Device 300 may correspond to UE 205, message origination device 210, application server device 215, MME 220, SGW 225, PGW 230, HSS 235, AAA 240, CSCF device 245, and/or roaming gateway 250. In some implementations, UE 205, message origination device 210, application server device 215, MME 220, SGW 225, PGW 230, HSS 235, AAA 240, CSCF device 245, and/or roaming gateway 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
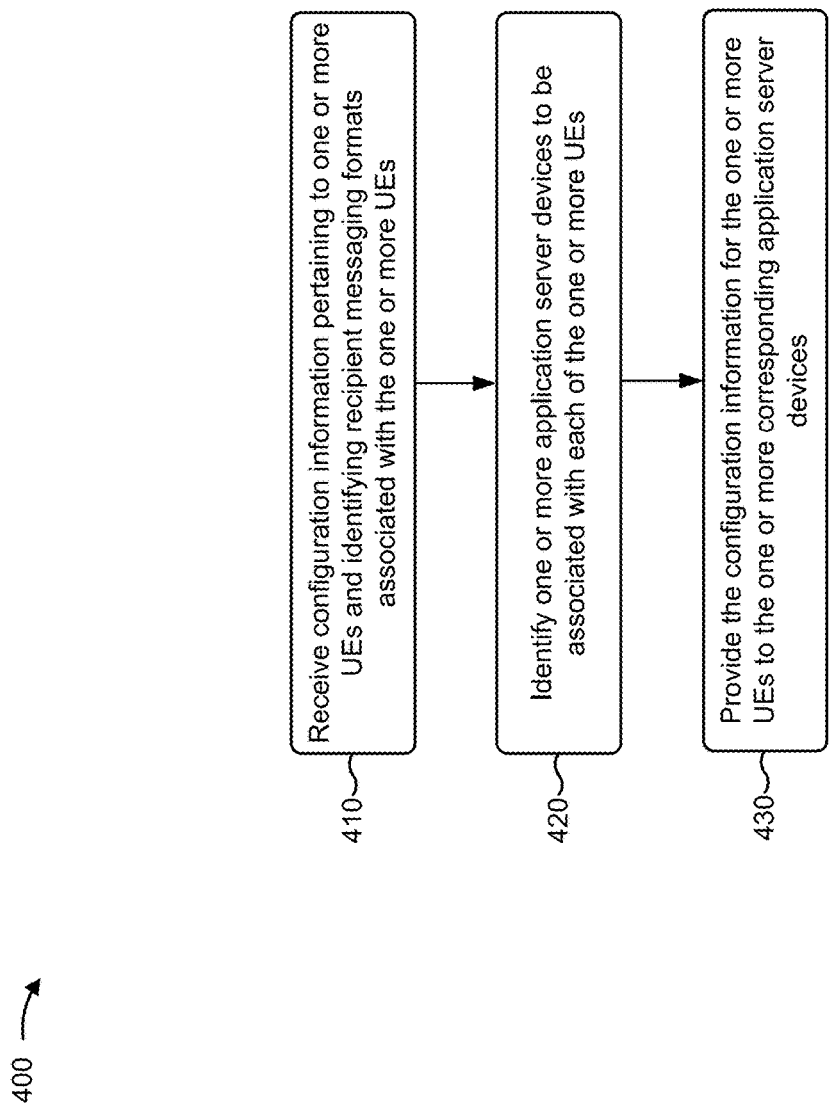
FIG. 4 is a flow chart of an example process for storing configuration information that identifies messaging formats of user equipment.

FIG. 4 is a flow chart of an example process 400 for storing configuration information that identifies messaging formats of user equipment. In some implementations, one or more process blocks of FIG. 4 may be performed by HSS 235. In some implementations, one or more process blocks of FIG. 4 may be performed by another device or a group of devices separate from or including HSS 235, such as UE 205, message origination device 210, application server device 215, MME 220, SGW 225, PGW 230, AAA 240, CSCF device 245, and/or roaming gateway 250. Additionally, or alternatively, one or more process blocks of FIG. 4 may be performed by a data mediations device, and/or by a device or component that provides an interface between information technology (IT) systems and network systems, such as a multimedia telephony application server.

As shown in FIG. 4, process 400 may include receiving configuration information pertaining to one or more UEs and identifying recipient messaging formats associated with the one or more UEs (block 410). For example, HSS 235 may receive configuration information from UE 205, AAA 240, message origination device 210, and/or another device. In some implementations, the configuration information may pertain to one or more UEs 205. For example, the configuration information may be received as part of a provisioning process for the one or more UEs 205.

In some implementations, the configuration information may include information that identifies recipient messaging formats associated with the one or more UEs 205. For example, if UE 205 uses a 3GPP (e.g., non-CDMA) standard for messaging, the configuration information may identify the 3GPP standard as the messaging format for UE 205. Similarly, if UE 205 uses a 3GPP2 (e.g., CDMA) standard for messaging, the configuration information may identify the 3GPP2 standard as the messaging format for UE 205.

In some implementations, the configuration information may identify a geographical location of one or more UEs 205, account information, payment information, billing information (e.g., a quantity of SMS messages permitted per month, a data usage allowance, etc.), or the like. In some implementations, the configuration information may include device identifiers of the one or more UEs 205 (e.g., a subscriber identity module (SIM) number, a telephone number, an integrated circuit card identifier (ICCID), a mobile device number (MDN), an international mobile equipment identity (IMEI), international mobile subscriber identity (IMSI), a Media Access Control (MAC) address, an Internet Protocol (IP) address, and/or another identifier).

In some implementations, HSS 235 may receive the configuration information based on one or more UEs 205 being activated with regard to the wireless network (e.g., based on the one or more UEs 205 connecting to the wireless network for the first time, based on the one or more UEs 205 being provisioned with regard to the wireless network, etc.). In some implementations, HSS 235 may receive the configuration information based on requesting configuration information relating to a particular UE 205 (e.g., based on determining that HSS 235 does not store configuration information relating to the particular UE 205). HSS 235 may use the configuration information to assign one or more home application server devices 215 for the one or more UEs 205, as described in greater detail below.

As further shown in FIG. 4, process 400 may include identifying one or more application server devices to be associated with the one or more UEs (block 420). For example, one or more application server devices 215 may be identified, to be associated with the one or more UEs 205 as home application server devices 215, based on device identifiers or subscription identifiers (e.g., MSISDNs) associated with the one or more UEs 205 and/or based on geographical home areas of subscribers associated with the one or more UEs 205. Home application server device 215 may route messages to and/or from a corresponding UE 205. As described above, when a message is en route to a recipient UE 205, the message may be provided to a home application server device 215 of the recipient UE 205 for delivery to the recipient UE 205 (e.g., via CSCF device 245 associated with the recipient UE 205). When a sending UE 205 sends a message, the message may be provided to a home application server device 215 of the sending UE 205 for routing to a recipient UE 205 (e.g., via a recipient application server device 215 associated with the recipient UE 205).

In some implementations, a particular UE 205 may be associated with a single home application server device 215. For example, a particular application server device 215 may act as home application server device 215 for a set of UEs 205, and each UE 205 may be assigned a single application server device 215 as a home application server device 215.

As further shown in FIG. 4, process 400 may include providing the configuration information for the one or more UEs to the one or more corresponding application server devices (block 430). For example, HSS 235 may provide the configuration information for the one or more UEs 205 to the one or more corresponding home application server devices 215 that have been assigned to the one or more UEs 205. Home application server device 215 may use the configuration information to determine messaging formats based on which to process and/or route messages to and/or from UE 205, as described in more detail below. For example, home application server device 215 may use the configuration information to determine whether a message should be converted from one messaging format to another based on the messaging format compatible with a recipient UE 205 that is associated with home application server device 215. In some implementations, when the configuration information includes information relating to billing a user of UE 205, the home application server device 215 of UE 205 may use the configuration information to determine billing information related to the UE 205, as also described in more detail below.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for routing and/or converting messages between sending user equipment and recipient user equipment based on respective messaging formats associated with the sending and recipient user equipment. In some implementations, one or more process blocks of FIG. 5 may be performed by a recipient application server device 215 (i.e., a home application server device 215 of recipient UE 205 that is to receive a message). In some implementations, one or more process blocks of FIG. 5 may be performed by another device or a group of devices separate from or including recipient application server device 215, such as UE 205, message origination device 210, another application server device 215 (e.g., a home application server device 215 of sending UE 205 that sends the message), MME 220, SGW 225, PGW 230, HSS 235, AAA 240, CSCF device 245, and/or roaming gateway 250.

As shown in FIG. 5, process 500 may include receiving a message, in an original messaging format, en route to a recipient UE (block 510). For example, recipient application server device 215 may receive a message en route to recipient UE 205. The message may include an SMS message, an MMS message, a short form message, or the like. When recipient application server device 215 receives the message, the message may be associated with an original messaging format. For example, based on capabilities of UE 205, the message may be formatted or encoded based on a 3GPP messaging format (e.g., when received from a sending UE 205 associated with a 3GPP/non-CDMA standard), a 3GPP2 messaging format (e.g., when received from a sending UE 205 associated with a 3GPP2/CDMA standard), or the like.

In some implementations, recipient application server device 215 may receive the message from a sending UE 205, or from a sending application server device 215 associated with the sending UE 205 (e.g., from a home application server device 215 of sending UE 205). In a scenario in which recipient application server device 215 is a home application server device 215 for both sending UE 205 and for recipient UE 205, recipient application server device 215 may receive the message from sending UE 205 (e.g., via CSCF device 245), as described in more detail with respect to FIG. 6A. For example, sending UE 205 and recipient UE 205 may be assigned the same application server device 215 as a home application server device.

In some implementations, sending UE 205 may be associated with a sending application server device 215 (i.e., a home application server device of sending UE 205) that is different than recipient application server device 215. In such implementations, recipient application server device 215 may receive the message from sending application server device 215 based on a protocol or interface associated with the original messaging format. For example, sending application server device 215 may not have information identifying the messaging format used at destination UE 205. Thus, the message format of the message, associated with sending UE 205, is not changed at sending message server device 215. For example, sending application server device 215 may provide the message based on the SIP protocol for the 3GPP messaging format, or based on the SS7 protocol for the 3GPP2 messaging format. Sending application server device 215 may receive the message from sending UE 205 via CSCF device 245.

In some implementations, recipient application server device 215 may receive the message from message origination device 210, or from a home application server device 215 corresponding to message origination device 210 (e.g., when the message includes a short form message, a voicemail notification message, or another type of message that is generated by a device other than UE 205). For example, when the message is generated by an application hosted by or associated with message origination device 210, recipient application server device 215 may receive the message from message origination device 210. In some implementations, recipient application server device 215 may receive the message via a Short Message Peer-to-Peer (SMPP) gateway. In this way, applications associated with the cellular network may generate and provide messages via implementations described herein.

In some implementations, the message may include a payload and message information. The payload may include content of the message (e.g., text, data, media, or the like). The message information may include, for example, routing information, information that identifies sending UE 205 and/or recipient UE 205, information that identifies a time at which the message was sent (e.g., a time stamp), or the like. In some implementations, the messaging format may determine a format of the payload and/or the message information. For example, the payload may be formatted and/or encrypted differently based on different messaging formats. As another example, the message information (e.g., the routing information, the time stamp, the information that identifies sending UE 205 and/or recipient UE 205, etc.) may be different, or may be formatted differently, for different messaging formats.

In some implementations, the message may be received via roaming gateway 250 (e.g., when sending UE 205 is associated with a different wireless network carrier than recipient UE 205, or when sending UE 205 is attached to roaming network 260). In such a situation, the original messaging format may be a format associated with a wireless network to which sending UE 205 is connected. For example, if sending UE 205 is connected to a cellular network associated with a 3GPP standard (e.g., a GSM network or another non-CDMA network), the original messaging format may be a 3GPP messaging format.

In some implementations, recipient application server device 215 may receive the message via a SIP over IP interface. For example, when sending UE 205 and/or sending application server device 215 are associated with a different network carrier or IMS network, or when sending UE and/or sending application server device 215 are associated with a 3GPP messaging format, recipient application server device 215 may receive the message via a SIP over IP interface. For inter-carrier messaging, SMS/SIP via IMS-GW may allow inter-carrier messaging traffic to use an IP network instead of using a legacy GSM-MAP network.

As further shown in FIG. 5, process 500 may include determining a recipient messaging format associated with the recipient UE (block 520). For example, recipient application server device 215 may determine a recipient messaging format associated with recipient UE 205. As described herein, the recipient messaging format may be the messaging format based on which messages are to be provided to recipient UE 205 (e.g., the messaging format compatible with recipient UE 205). For example, when recipient UE 205 is associated with a 3GPP standard, recipient application server device 215 may identify the recipient messaging format as a 3GPP messaging format. When recipient UE 205 is associated with a 3GPP2 standard, recipient application server device 215 may identify the recipient messaging format as a 3GPP2 messaging format.

In some implementations, recipient application server device 215 may determine the recipient messaging format based on configuration information associated with recipient UE 205 (e.g., received from HSS 235). For example, the message may include information that identifies recipient UE 205 (e.g., routing information, a device identifier, or the like). Recipient application server device 215 may store configuration information for UEs 205 to which recipient application server device 215 has been assigned as a home application server device, and may determine the recipient messaging format for UE 205 based on the configuration information.

In some cases, recipient application server device 215 may receive information that identifies sending UE 205 and/or information that identifies the message. For example, recipient application server device 215 may receive a time stamp and/or submission time associated with the message, a device identifier that identifies sending UE 205, or the like. Recipient application server device 215 may use the information that identifies sending UE 205 or the message to process and/or route information associated with the message. In some implementations, recipient application server device 215 may provide the information that identifies sending UE 205 to sending application server device 215 in association with an acknowledgment message, as described in more detail below.

As further shown in FIG. 5, process 500 may include determining whether the original messaging format matches the recipient messaging format (block 530). For example, recipient application server device 215 may determine whether the original messaging format matches the recipient messaging format. In some implementations, recipient application server device 215 may compare information that identifies the original messaging format with configuration information identifying a compatible messaging format of recipient UE 205 to determine whether the original messaging format matches the recipient messaging format.

As further shown in FIG. 5, if the original messaging format does not match the recipient messaging format (block 530—NO), then process 500 may include converting the message to the recipient messaging format, to generate a converted message, and providing the converted message (block 540). For example, when recipient application server device 215 determines that the original messaging format does not match the recipient messaging format, recipient application server device 215 may convert the message to the recipient messaging format to generate a converted message. Recipient application server device 215 may provide the converted message to recipient UE 205, or may provide the converted message to another device for routing to recipient UE 205 (e.g., CSCF device 245, a message delivery device, or the like). In some implementations, when the recipient of the message is an application, recipient application server device 215 may provide the message to a message origination device 210 that is associated with the application (e.g., via an SMPP gateway).

In some implementations, recipient application server device 215 may convert the message to the recipient messaging format by modifying a payload and/or message information of the message. For example, recipient application server device 215 may encrypt or format the payload based on the recipient messaging format. As another example, recipient application server device 215 may generate converted message information based on the recipient messaging format and based on message information received with the message (e.g., a time stamp, a submission time identifier, routing information, etc.), and may provide the payload in association with the converted message information.

By converting the message to the recipient messaging format at recipient application server device 215, sending application server device 215 and/or sending UE 205 may not need to be configured to communicate with recipient UE 205 or recipient application server device 215 using the recipient messaging format, even when the original messaging format differs from the recipient messaging format. Thus, computing resources associated with sender application server device 215 and/or sender UE 205 are conserved. Furthermore, by routing messages via application server devices 215 corresponding to UEs 205, irrespective of messaging formats associated with UEs 205, implementations described herein increase uniformity of architecture of the wireless network.

As further shown in FIG. 5, if the original messaging format matches the recipient messaging format (block 530—YES), then process 500 may include providing the message in the original messaging format (block 550). For example, when the original messaging format matches the recipient messaging format, recipient application server device 215 may not convert the message, and may provide the message in the original messaging format. For example, recipient application server device 215 may provide the message for delivery to recipient UE 205 by CSCF device 245, an SMPP gateway, a message delivery device, or a similar device. In some implementations, when the recipient of the message is an application, recipient application server device 215 may provide the message to a message origination device 210 that is associated with the application.

As further shown in FIG. 5, process 500 may include providing an acknowledgment message in the original messaging format (block 560). For example, recipient application server device 215 may provide an acknowledgment message to a device from which recipient application server device 215 received the message (e.g., sending UE 205, message origination device 210, sending application server device 215, roaming gateway 250, etc.). Recipient application server device 215 may provide the acknowledgment message in the original messaging format. For example, recipient application server device 215 may receive the acknowledgment message from recipient UE 205 in the recipient messaging format, may convert the acknowledgment message to the original messaging format, and may provide the acknowledgment message in the original messaging format. Sending application server device 215 may provide the acknowledgment message to sending UE 205 (e.g., via CSCF device 245).

In some implementations, recipient application server device 215 may determine the original messaging format based on information associating the original messaging format with the message that was transmitted to recipient UE 205. Additionally, or alternatively, recipient application server device 215 may determine the original messaging format based on recipient application server device 215 storing configuration information indicating that the destination of the acknowledgment message (e.g., sending UE 205, sending application server device 215, etc.) is associated with the original messaging format. In some implementations (e.g., when the original messaging format and the recipient messaging format are the same), recipient application server device 215 may forward the acknowledgment message without converting the acknowledgment message.

As an example, when the original messaging format is a 3GPP messaging format (e.g., received via a SIP over IP interface), the acknowledgment message may include a SIP 200 OK message and/or another 3GPP-formatted acknowledgment message. As another example, when the original messaging format is a 3GPP2 messaging format, the acknowledgment message may include an RP-DATA message, an RP-ACK message, and/or another 3GPP2-formatted acknowledgment message.

In some implementations, recipient application server device 215 may provide the acknowledgment message based on a particular protocol or interface. For example, recipient application server device 215 may provide 3GPP acknowledgment messages via a SIP over IP interface, and recipient application server device 215 may provide 3GPP2 acknowledgment messages via an SS7 interface. In this way, recipient application server device 215 uses a protocol or interface based on which sending UE 205 and/or sending application server device 215 are configured to communicate, thereby saving processing resources of sending UE 205 and/or sending application server device 215. Providing acknowledgment messages based on an originating messaging format also conserves resources that would otherwise be used to reconfigure sending UE 205 and/or sending application server device 215 based on the recipient messaging format.

In some implementations, recipient application server device 215 may provide the acknowledgment message via a SIP over IP interface. For example, when sending application server device 215 is associated with a 3GPP cellular network, and/or when sending UE 205 is associated with a 3GPP messaging standard, recipient application server device 215 may provide the acknowledgment message via a SIP over IP interface (e.g., with a payload based on the 3GPP messaging format). As another example, when sending application server device 215 is associated with a different IMS core than recipient application server device 215, recipient application server device 215 may provide the acknowledgment message via a SIP over IP interface. In this way, recipient application server device 215 facilitates communication between cellular networks using the SIP over IP interface, which improves uniformity of architecture of cellular networks and reduces a quantity of different messaging format to be used in cellular networks (e.g., SS7, GSM-MAP, etc.).

In some implementations, recipient application server device 215 may provide identification information, in association with the acknowledgment message, based on which to identify the message with which the acknowledgment message is associated. For example, recipient application server device 215 may provide a device identifier associated with sending UE 205 and/or recipient UE 205, may provide a message identifier, may provide a time stamp or a submission time identifier associated with the message, or the like. Based on the identification information, sending application server device 215 may identify sending UE 205 (e.g., based on comparing the identification information to stored information identifying the message and/or sending UE 205).

In some implementations, sending application server device 215 may transmit a time stamp or submission time identifier to recipient application server device 215, and recipient application server device 215 may use the time stamp or submission time identifier to identify the message. For example, sending application server device 215 may provide a time stamp to recipient application server device 215, and recipient application server device 215 may generate an acknowledgment message based on the time stamp (e.g., an RP-ACK message, a SIP 200 OK message, etc.). Additionally, or alternatively, recipient application server device 215 may use the time stamp to generate a message to be provided to sending UE 205 via sending application server device 215 (e.g., an SMS-STATUS-REPORT message, etc.). By transmitting a time stamp or submission time identifier, recipient application server device 215 permits sending application server device 215 to identify messages corresponding to acknowledgment messages, irrespective of whether recipient UE 205 is a 3GPP UE 205 or a 3GPP2 UE 205.

In some implementations, devices of environment 200 (e.g., UE 205, message origination device 210, application server device 215, etc.) may provide response messages based on receiving a message or an acknowledgment message. For example, devices of environment 200 may provide an RP-ACK message when communicating based on a 3GPP standard, may provide a SIP 200 OK when communicating based on a 3GPP2 standard, or the like. Response messages are shown in connection with FIGS. 6A-6D, below. Response messages may be different than acknowledgment messages. For example, an acknowledgment message may indicate to sending UE 205 that an SMS message was successfully delivered via application server device 215, while a response message may indicate that a direct communication to another device was received by the other device.

As further shown in FIG. 5, process 500 may include storing and/or providing billing information relating to the message (block 570). For example, recipient application server device 215 may store and/or provide billing information relating to the message and/or recipient UE 205. In some implementations, the billing information may include a quantity of messages associated with recipient UE 205, a size of a message, a message type of a message (e.g., SMS, MMS, short form, etc.), or the like. In some implementations, recipient application server device 215 may provide the billing information to another device (e.g., a billing device, recipient UE 205, HSS 235, AAA 240, or the like). Recipient application server device 215 may provide the billing information continuously, periodically, based on a request from the other device, or the like.

By using a home application server device 215 to convert and/or route messages to recipient UEs 205, billing information can be determined more consistently and/or by fewer devices. For example, in a situation where some recipient UEs 205 are not associated with home application server devices 215, the billing information may be gathered from multiple, different devices, which may use additional processor and/or network resources as compared to gathering the billing information from the home application server device 215.

In some implementations, when recipient UE 205 is attached to roaming network 260, some or all of the operations described above may be performed by roaming gateway 250. For example, sending application server device 215 may provide a message to a recipient application server device 215 that is associated with recipient UE 205. Recipient application server device 215 may fail to deliver the message based on recipient UE 205 being connected to roaming network 260. Recipient application server device 215 may determine that recipient UE 205 is connected to roaming network 260 (e.g., based on querying HSS 235 to determine a status of recipient UE 205), and may provide the message to roaming gateway 250 for routing to recipient UE 205.

Roaming gateway 250 may determine whether roaming network 260 and the sending wireless network are associated with the same standards or messaging formats. That is, roaming gateway 250 may determine whether an original messaging format associated with the sending wireless network matches a recipient messaging format associated with roaming network 260. For example, roaming networks may not always have network architectures that utilize home application server devices 215 to be interoperable with message format conversions.

When the original messaging format matches the recipient messaging format, roaming gateway 250 may transmit the message toward recipient UE 205 in the original messaging format. When the original messaging format does not match the recipient messaging format, roaming gateway 250 may convert the message to the recipient messaging format, and may transmit a converted message toward recipient UE 205. Roaming gateway 250 may receive an acknowledgment message from UE 205, and may selectively provide the acknowledgment message in the recipient messaging format, or convert the acknowledgment message to the original messaging format, based on whether the recipient messaging format matches the original messaging format. In this way, roaming gateway 250 improves uniformity of architecture of the wireless network and conserves processor resources of sending UE 205 and/or sending application server device 215 that would otherwise be used to convert messages to the recipient messaging format.

In some implementations, sending application server device 215 and recipient application server device 215 may be a mated pair of application server devices. In such a case, when sending UE 205 is associated with a 3GPP messaging format, messages may be delivered to recipient UE 205 without being routed via recipient application server device 215, thereby causing recipient application server device 215 not to store routing information (e.g., a time stamp, a submission time, etc.) identifying the message and/or sending UE 205. Thus, transmission of acknowledgment messages to sending UE 205 may be hindered.

To enable recipient UE 205 to transmit acknowledgment messages to sending UE 205, CSCF device 245 may store information identifying sending UE 205 and sending application server device 215. For example, sending UE 205 may be associated with a sending CSCF device 245, and recipient UE 205 may be associated with a recipient CSCF device 245. Sending CSCF device 245 may receive the message from sending UE 205 en route to sending application server device 215, and may store identification information identifying the message, sending UE 205, and/or sending application server device 215 (e.g., a network address, a time stamp, a device identifier, etc.). Sending application server device 215 may provide the message to recipient CSCF device 245, and recipient CSCF device 245 may provide the message to recipient UE 205. Based on receiving the message, recipient UE 205 may provide an acknowledgment message to recipient CSCF device 245, and may provide information identifying sending UE 205 (e.g., a network address, a device identifier, etc.).

Based on the information identifying sending UE 205, recipient CSCF device 245 may identify sending application server device 215. For example, recipient CSCF device 245 may obtain the identification information from sending CSCF device 245, and may use the identification information to transmit the acknowledgment message to sending application server device 215 for transmission to sending UE 205. In this way, acknowledgment messages between UEs 205 that are associated with mated pair application server devices 215 are facilitated using a standardized network architecture, which improves functionality of the cellular network with regard to the 3GPP messaging format.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIGS. 6A-6D are call flow diagrams of example call flows 600 for routing and/or converting messages between sending UE 205-1 and recipient UE 205-2 based on respective messaging formats associated with UEs 205-1 and 205-2. For the purpose of FIGS. 6A-6D, CSCF 245 is omitted to improve readability of FIGS. 6A-6D. Assume that sending UE 205-1 sends and receives messages via CSCF 245-1, and assume that recipient UE 205-2 sends and receives messages via CSCF 245-2.

Figure 6A:
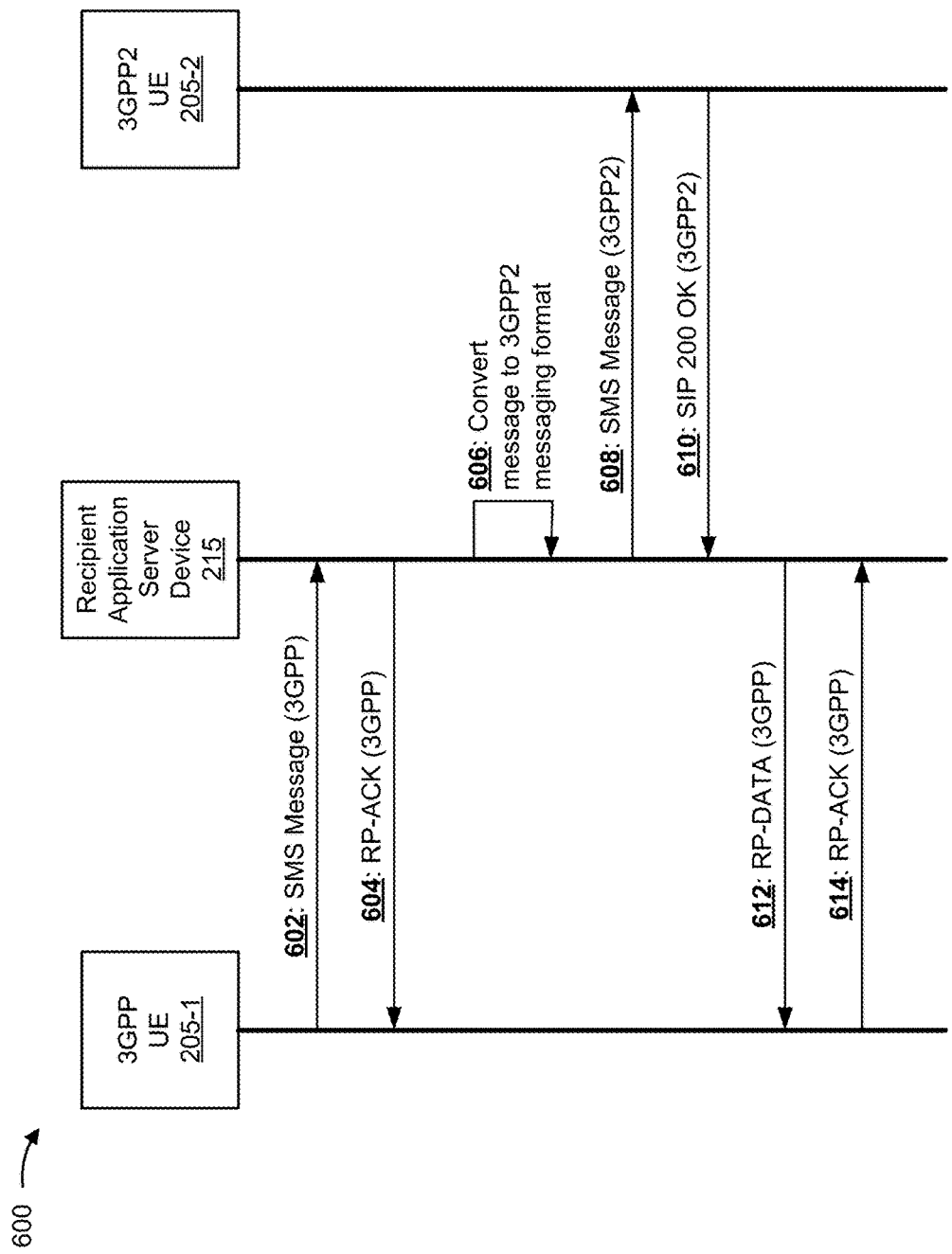
FIGS. 6A-6D are call flow diagrams of example call flows for routing and/or converting messages between sending user equipment and recipient user equipment based on respective messaging formats associated with the sending and recipient user equipment.

FIG. 6A is an example call flow for delivering an SMS message from a sending UE 205-1 that is associated with the 3GPP messaging format to a recipient UE 205-2 that is associated with the 3GPP2 format. For the purpose of FIG. 6A, assume that both of UEs 205-1 and 205-2 are associated with recipient application server device 215 as a home application server device.

As shown in FIG. 6A, and by reference number 602, UE 205-1 may provide a message, in a 3GPP messaging format, to recipient application server device 215. As further shown in FIG. 6A, and by reference number 604, recipient application server device 215 may provide an acknowledgment message (e.g., RP-ACK) to UE 205-1 in the 3GPP messaging format based on the message. As further shown in FIG. 6A, and by reference number 606, recipient application server device 215 may convert the message to the 3GPP2 messaging format (e.g., based on UE 205-2 being associated with the 3GPP2 messaging format).

As further shown in FIG. 6A, and by reference number 608, recipient application server device 215 may provide the message in the 3GPP2 messaging format to UE 205-2. As shown by reference number 610, UE 205-2 may provide an acknowledgment message in the 3GPP2 messaging format (e.g., SIP 200 OK) to recipient application server device 215 based on the message in the 3GPP2 format. As further shown in FIG. 6A, and by reference number 612, recipient application server device 215 may provide the acknowledgment message in the 3GPP messaging format (e.g., RP-DATA) to UE 205-1. For example, recipient application server device 215 may provide the acknowledgment message as a payload of the RP-DATA message. Additionally, or alternatively, recipient application server device 215 may convert the acknowledgment message to the 3GPP messaging format, and may provide the acknowledgment message as a converted acknowledgment message. As further shown in FIG. 6A, and by reference number 614, UE 205-1 may provide an acknowledgment message in the 3GPP messaging format (e.g., RP-ACK) to recipient application server device 215 based on receiving the RP-DATA message.

Figure 6B:
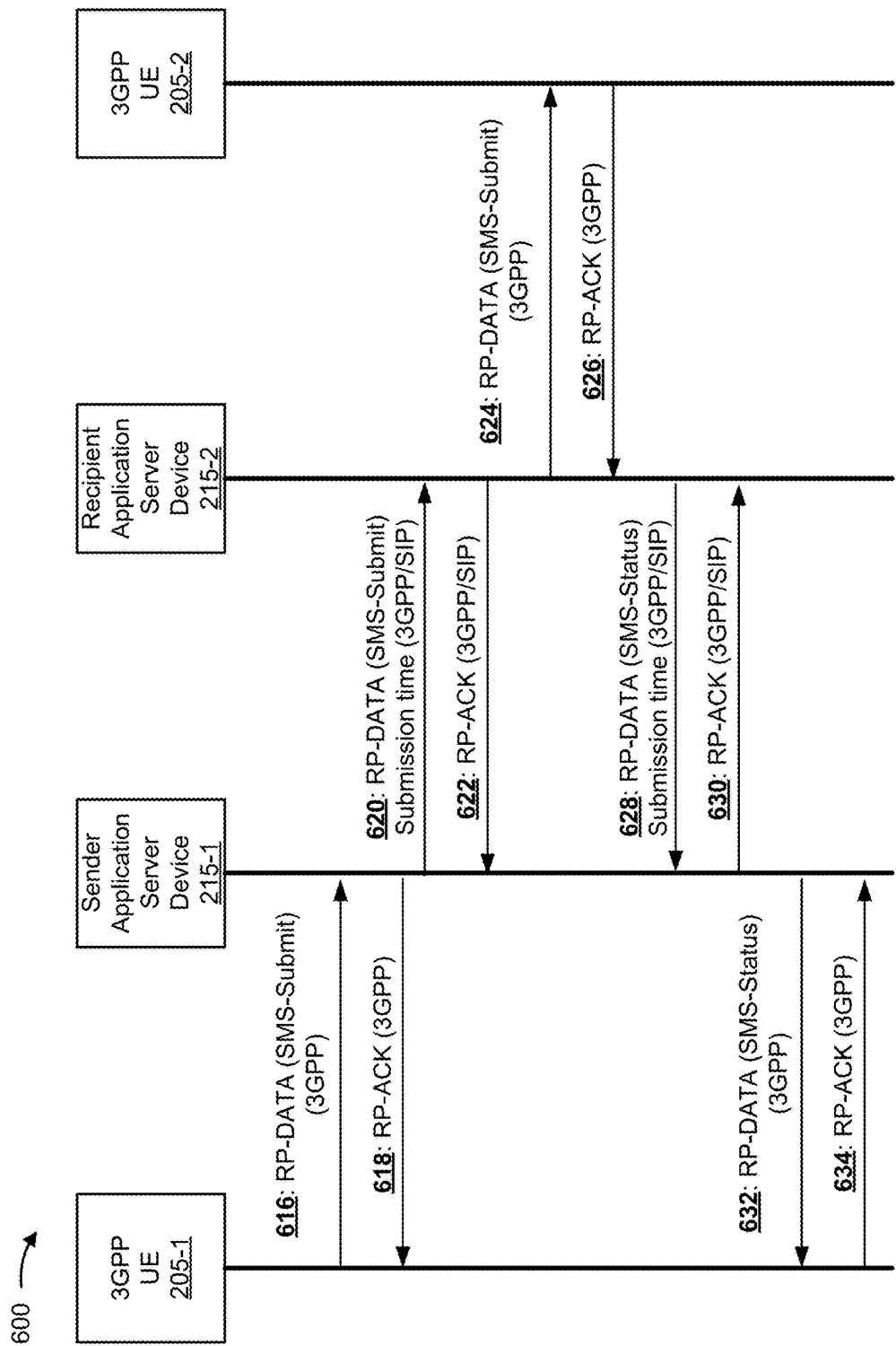

FIG. 6B is an example call flow for delivering an SMS message from a sending UE 205-1 that is associated with the 3GPP messaging format to a recipient UE 205-2 that is associated with the 3GPP messaging format. For the purpose of FIG. 6B, assume that UE 205-1 is associated with sender application server device 215-1 as a home application server device, and assume that UE 205-2 is associated with recipient application server device 215-2 as a home application server device. As shown in FIG. 6B, and by reference number 616, UE 205-1 may provide a message (e.g., RP-DATA (SMS-Submit), in the 3GPP messaging format, to sender application server device 215-1. As further shown in FIG. 6B, and by reference number 618, sender application server device 215-1 may provide an RP-ACK message, in the 3GPP messaging format, to UE 205-1 based on receiving the message.

As further shown in FIG. 6B, and by reference number 620, sender application server device 215-1 may provide the message, in the 3GPP format and via a SIP over IP interface, to recipient application server device 215-2. As further shown, sender application server device 215-1 may provide information identifying a submission time associated with the message. As further shown in FIG. 6B, and by reference number 622, recipient application server device 215-2 may provide an RP-ACK message, in the 3GPP messaging format and via the SIP over IP interface, to sender application server device 215-1 based on receiving the message.

As further shown in FIG. 6B, and by reference number 624, recipient application server device 215-2 may provide the message to UE 205-2 in the 3GPP messaging format. As further shown in FIG. 6B, and by reference number 626, UE 205-2 may provide an RP-ACK message to recipient application server device 215-2 based on receiving the message.

As further shown in FIG. 6B, and by reference number 628, recipient application server device 215-2 may provide an acknowledgment message in the 3GPP messaging format and via a SIP over IP interface (e.g., RP-DATA (SMS-Status)), and may provide information identifying the submission time of the message to sender application server device 215-1. Sender application server device 215-1 may use the submission time to identify the message and/or sender UE 205-1 associated with the acknowledgment message. As further shown in FIG. 6B, and by reference number 630, sender application server device 215-1 may provide an RP-ACK message, in the 3GPP messaging format and via the SIP over IP interface, to recipient application server device 215-2 based on receiving the RP-DATA message. As further shown in FIG. 6B, and by reference number 632, sender application server device 215-1 may provide the acknowledgment message to UE 205-1. As further shown in FIG. 6B, and by reference number 634, UE 205-1 may provide an RP-ACK message, in the 3GPP messaging format, to sender application server device 215-1 based on receiving the acknowledgment message.

Figure 6C:
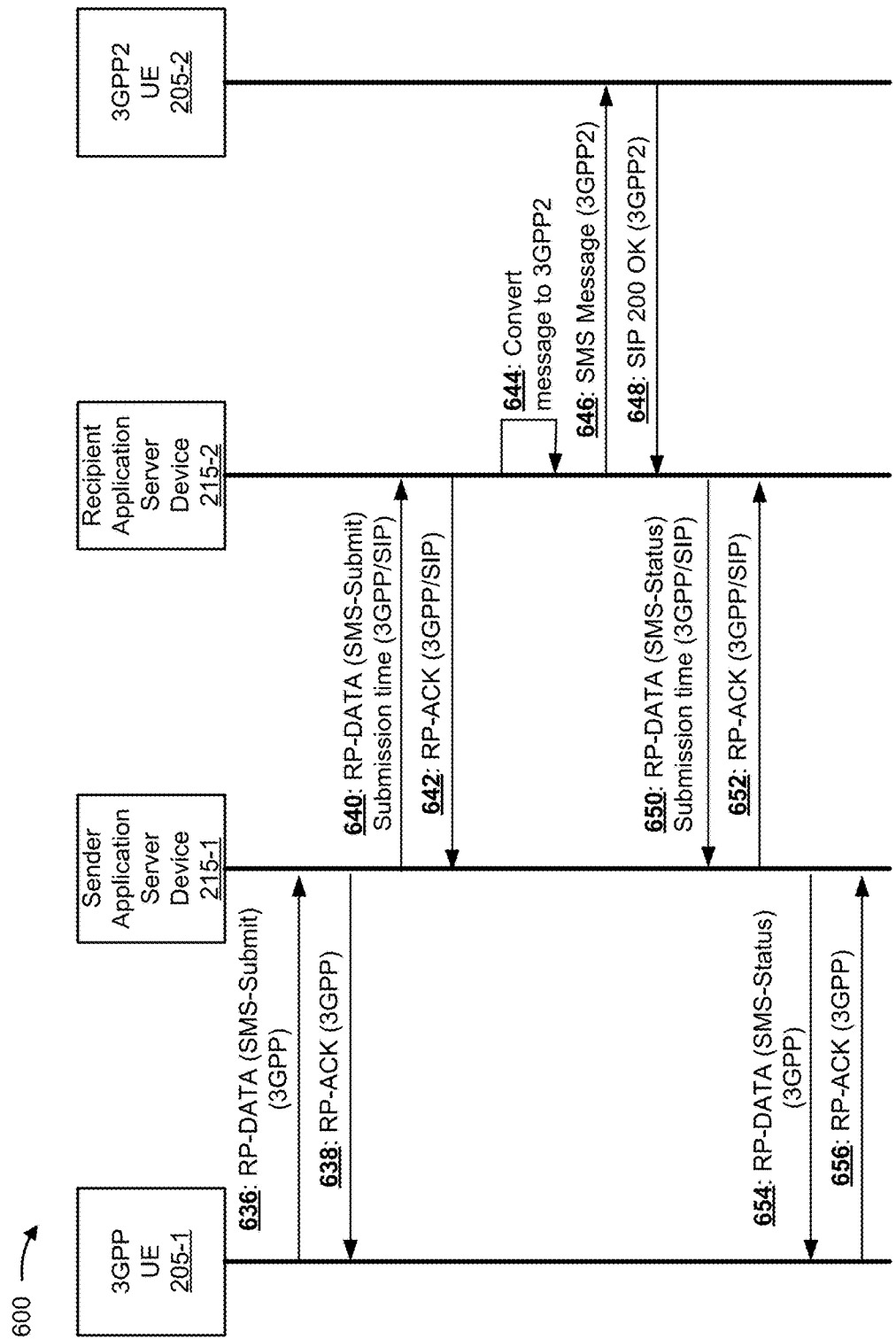

FIG. 6C is an example call flow for delivering an SMS message from a sending UE 205-1 that is associated with the 3GPP messaging format to a recipient UE 205-2 that is associated with the 3GPP2 format. For the purpose of FIG. 6C, assume that UE 205-1 is associated with sender application server device 215-1 as a home application server device, and assume that UE 205-2 is associated with recipient application server device 215-2 as a home application server device.

As shown in FIG. 6C, and by reference number 636, UE 205-1 may provide a message, in the 3GPP messaging format, to sender application server device 215-1 (e.g., RP-DATA (SMS-Submit). As further shown in FIG. 6C, and by reference number 638, sender application server device 215-1 may provide an RP-ACK message, in the 3GPP messaging format, to UE 205-1 based on receiving the message.

As further shown in FIG. 6C, and by reference number 640, sender application server device 215-1 may provide the message, in the 3GPP messaging format and via a SIP over IP interface, to recipient application server device 215-2. As further shown, sender application server device 215-1 may provide a submission time, associated with the message, to recipient application server device 215-2. As further shown in FIG. 6C, and by reference number 642, recipient application server device 215-2 may provide an RP-ACK message, in the 3GPP messaging format and via the SIP over IP interface, to sender application server device 215-1 based on the message.

As further shown in FIG. 6C, and by reference number 644, recipient application server device 215-2 may convert the message to the 3GPP2 messaging format based on recipient UE 205-2 being associated with the 3GPP2 messaging format. As further shown in FIG. 6C, and by reference number 646, recipient application server device 215-2 may provide the message to UE 205-2 in the 3GPP2 messaging format. As further shown in FIG. 6C, and by reference number 648, UE 205-2 may provide a SIP 200 OK message, in the 3GPP2 messaging format, to recipient application server device 215-2 based on receiving the message.

As further shown in FIG. 6C, and by reference number 650, recipient application server device 215-2 may provide an acknowledgment message, in the 3GPP messaging format and via the SIP over IP interface (e.g., RP-DATA (SMS-Status)), to sender application server device 215-1 based on UE 205-1 being associated with the 3GPP messaging format. For example, the acknowledgment message may be provided as a payload of the RP-DATA message. Recipient application server device 215-2 may convert the acknowledgment message to the 3GPP messaging format, and may provide a converted acknowledgment message in the 3GPP format. Additionally, or alternatively, recipient application server device 215-2 may generate the acknowledgment message in the 3GPP messaging format.

As further shown, the RP-DATA message may be provided in association with the submission time, which may permit sending application server device 215-1 to identify the SMS message and/or sending UE 205 associated with the acknowledgment message. As further shown in FIG. 6C, and by reference number 652, sender application server device 215-1 may provide an RP-ACK message, in the 3GPP messaging format and via the SIP over IP interface, to recipient application server device 215-2 based on receiving the acknowledgment message.

As further shown in FIG. 6C, and by reference number 654, sender application server device 215-1 may provide the acknowledgment message, in the 3GPP messaging format, to UE 205-1. Sender application server device 215-1 may identify UE 205-1 based on the submission time (e.g., based on stored information associating the submission time with UE 205-1 and/or the SMS message). As further shown in FIG. 6C, and by reference number 656, UE 205-1 may provide an RP-ACK message, in the 3GPP messaging format, to sender application server device 215-1 based on receiving the acknowledgment message.

Figure 6D:
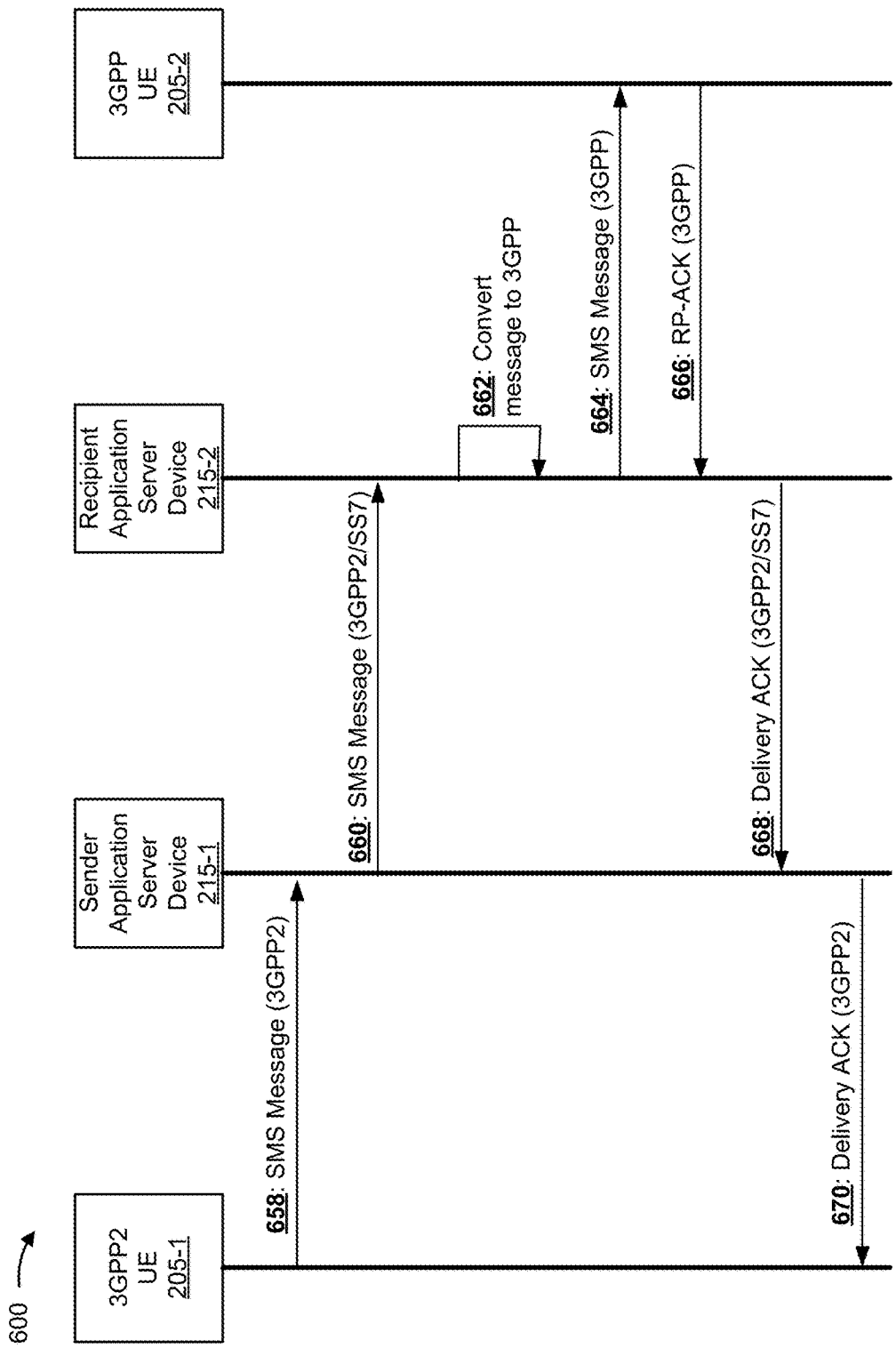

FIG. 6D is an example call flow for delivering an SMS message from a sending UE 205-1 that is associated with the 3GPP2 messaging format to a recipient UE 205-2 that is associated with the 3GPP format. For the purpose of FIG. 6D, assume that UE 205-1 is associated with sender application server device 215-1 as a home application server device, and assume that UE 205-2 is associated with recipient application server device 215-2 as a home application server device.

As shown in FIG. 6D, and by reference number 658, UE 205-1 may provide a message in the 3GPP2 messaging format to sender application server device 215-1. As further shown in FIG. 6D, and by reference number 660, sender application server device 215-1 may provide the message to recipient application server device 215-2 via an SS7 interface. As further shown in FIG. 6D, and by reference number 662, recipient application server device 215-2 may convert the message to the 3GPP messaging format based on recipient UE 205-2 being associated with the 3GPP messaging format.

As further shown in FIG. 6D, and by reference number 664, recipient application server device 215-2 may provide the message, in the 3GPP messaging format, to UE 205-2. As further shown in FIG. 6D, and by reference number 666, UE 205-2 may provide an RP-ACK message, in the 3GPP messaging format, to recipient application server device 215-2 based on receiving the message. As further shown in FIG. 6D, and by reference number 668, recipient application server device 215-2 may provide an acknowledgment message, in the 3GPP2 messaging format, to sender application server device 215-1 via the SS7 interface. As further shown in FIG. 6D, and by reference number 670, sender application server device 215-1 may provide the acknowledgment message to UE 205-1.

As indicated above, FIGS. 6A-6D are provided merely as an example. Other examples are possible and may differ from what was described with regard to FIGS. 6A-6D.

Figure 7:
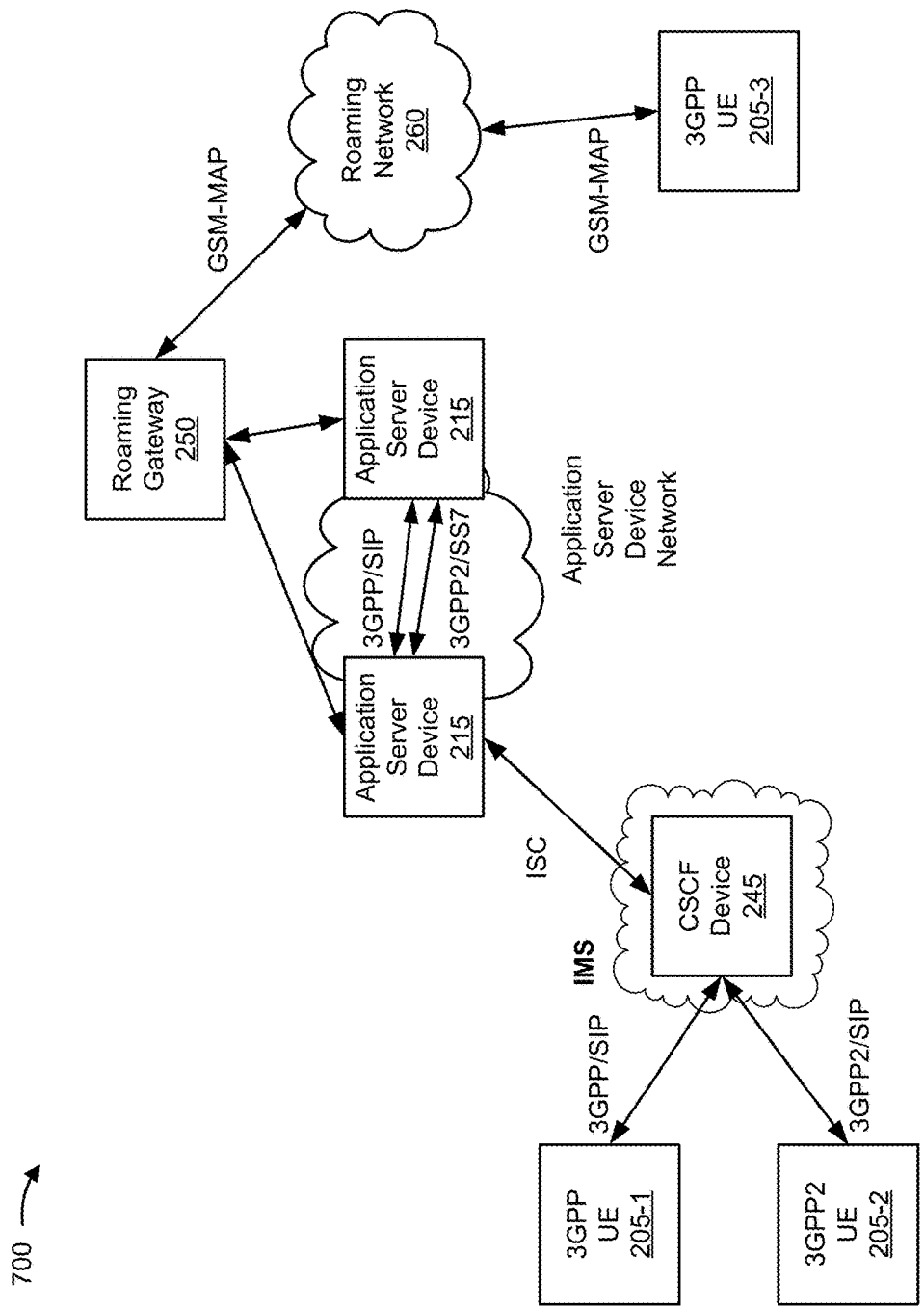
FIG. 7 is a diagram of an example implementation of interfaces between devices of FIG. 2.

FIG. 7 is a diagram of an example implementation 700 of interfaces between devices of FIG. 2. As shown in FIG. 7, 3GPP UE 205-1 may communicate with CSCF device 245 based on a 3GPP SIP interface. As further shown, 3GPP2 UE 205-2 may communicate with CSCF device 245 (e.g., the same CSCF device 245 or a different CSCF device 245) based on a 3GPP2 SIP interface. As shown, CSCF device 245 may communicate with application server device 215 based on an IMS service control (ISC) interface.

As shown, application server devices 215 may communicate based on a 3GPP SIP interface and based on a 3GPP2 SS7 interface. For example, when application server device 215 receives a message from 3GPP2 UE 205-2, application server device 215 may forward the message to a recipient application server device 215 based on the 3GPP2 SS7 interface. When application server device 215 receives a message from 3GPP UE 205-1, application server device 215 may forward the message to a recipient application server device 215 based on the 3GPP SIP interface.

As shown, roaming gateway 250 may communicate with roaming network 260 based on a GSM-MAP interface. As further shown, roaming network 260 may communicate with 3GPP UE 205-3 (e.g., a roaming UE) based on the GSM-MAP interface.

As indicated above, FIG. 7 is provided merely as an example. Other examples are possible, and may differ from what was described with regard to FIG. 7.

As described herein, a standard architecture of application server devices routes messages between UEs associated with different cellular network standards, thus simplifying network implementation, reducing complexity of network architecture, and standardizing the interfaces used between network devices irrespective of the messaging format associated with the recipient UE. For example, application server devices associated with different IMS cores or different cellular networks may use a SIP over IP interface to communicate, irrespective of whether the recipient UE is associated with a 3GPP messaging format or a 3GPP2 messaging format. In some implementations, billing information for a recipient UE can be handled by the recipient application server device irrespective of which standards the sending and receiving UEs are associated with.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A cellular network device, comprising:
a memory; and
one or more processors to:
receive, from a sending device, a message in a first messaging format in route to user equipment for which the cellular network device is a home network device,
the first messaging format corresponding to one of a first cellular network standard or a second cellular network standard;
determine whether the user equipment is associated with the first messaging format or with a second messaging format based on configuration information corresponding to the home network device,
the first messaging format corresponding to one of the first cellular network standard or the second cellular network standard,
the second messaging corresponding to a different one of the first cellular network standard or the second cellular network standard, and
the first cellular network standard and the second cellular network standard being different cellular network standards; and based on whether the user equipment is associated with the first messaging format or the second messaging format, selectively:
provide the message in the first messaging format, or
convert the message to the second messaging format and provide the message in the second messaging format,
the message being provided in the first messaging format when the user equipment is associated with the first messaging format, and
the message being converted to the second messaging format and provided when the user equipment is associated with the second messaging format.

2. The cellular network device of claim 1, where the one or more processors are further to:
transmit, toward the sending device, an acknowledgment message based on the first messaging format.

3. The cellular network device of claim 2, where the one or more processors, when receiving the message, are to:
receive a time stamp identifying a time at which the message was generated or transmitted by a sending user equipment; and
where the one or more processors, when transmitting the acknowledgment message, are to:
transmit the acknowledgment message in association with the time stamp,
the time stamp permitting the sending device to determine that the acknowledgment message is associated with the message.

4. The cellular network device of claim 2, where the one or more processors are further to:
receive the acknowledgment message from the user equipment in the second messaging format,
the acknowledgment message being received in the second messaging format based on the user equipment being associated with the second messaging format;
convert the acknowledgment message to the first messaging format; and
transmit the acknowledgment message in the first messaging format.

5. The cellular network device of claim 1, where the sending device is associated with at least one of:
a different cellular network than the cellular network device, or
a different IP Multimedia Subsystem (IMS) core than the cellular network device.

6. The cellular network device of claim 1, where the first messaging format corresponds to a 3GPP2 standard; and
where the one or more processors, when receiving the message, are to:
receive the message based on a Signaling System 7 (SS7) interface.

7. The cellular network device of claim 1, where the first cellular network standard is one of:
a Third Generation Partnership Project (3GPP) cellular network standard, or
a 3GPP2 cellular network standard,
where the second cellular network standard is one of the 3GPP cellular network standard or the 3GPP2 cellular network standard, and
where the first cellular network standard and the second cellular network standard are associated with different cellular network standards of the 3GPP cellular network standard and the 3GPP2 cellular network standard.

8. The cellular network device of claim 7, where the one or more processors are to:
receive the configuration information based on the cellular network device being associated with a geographical area associated with a device identifier assigned to the user equipment; and
store the configuration information.

9. A method, comprising:
receiving, from a first network device by a second network device, a message in a first messaging format in route to a recipient user equipment (UE) for which the second network device is a home network device,
the first messaging format corresponding to one of a first cellular network standard or a second cellular network standard, and
the message being received via a first interface associated with the first messaging format;
determining, by the second network device, whether the recipient user equipment is associated with the first messaging format or with a second messaging format based on configuration information corresponding to the home network device,
the first messaging format corresponding to one of the first cellular network standard or the second cellular network standard,
the second messaging format corresponding to a different one of the first cellular network standard or the second cellular network standard, and
the first cellular network standard and the second cellular network standard being different cellular network standards; and
based on whether the recipient user equipment is associated with the first messaging format or the second messaging format, selectively:
providing, by the second network device, the message in the first messaging format via the first interface, or
converting the message to the second messaging format and providing the message via a second interface associated with the second messaging format,
the message being provided in the first messaging format when the recipient user equipment is associated with the first messaging format, and
the message being provided in the second messaging format when the recipient user equipment is associated with the second messaging format.

10. The method of claim 9, further comprising:
providing, toward the first network device and by the second network device, an acknowledgment message based on the first messaging format.

11. The method of claim 10, where receiving the message further comprises:
receiving, by the second network device, a time stamp in association with the message,
the time stamp identifying a time at which the message was generated or transmitted; and
where providing the acknowledgment message further comprises:
providing the acknowledgment message in association with the time stamp,
the time stamp permitting the first network device to identify a sending user equipment that generated the message.

12. The method of claim 10, where providing the acknowledgment message comprises:
providing the acknowledgment message via the first interface.

13. The method of claim 9, where the configuration information is based on provisioning the recipient user equipment.

14. A non-transitory computer-readable medium storing instructions, the instructions comprising:
one or more instructions that, when executed by one or more processors of a network device, cause the one or more processors to:
receive, from a sending device, a message in a first messaging format in route to a recipient device for which the network device is assigned as a home network device when the recipient device is provisioned by a first cellular network,
the first messaging format corresponding to a first cellular network standard, and
the message being received via a Session Initiation Protocol (SIP) over Internet Protocol (IP) interface;
determine whether the recipient device is associated with the first messaging format or with a second messaging format based on configuration information corresponding to the home network device,
the second messaging format corresponding to a second cellular network standard different than the first cellular network standard, and
the first cellular network standard and the second cellular network standard being different cellular network standards;
based on whether the recipient device is associated with the first messaging format or the second messaging format, selectively:
provide the message in the first messaging format, or
provide the message in the second messaging format,
the message being provided in the first messaging format when the recipient device is associated with the first messaging format, and
the message being provided in the second messaging format when the recipient device is associated with the second messaging format; and
forward, toward the sending device and from the recipient device, an acknowledgment message based on the first messaging format,
the acknowledgment message being forwarded via the SIP over IP interface.

15. The non-transitory computer-readable medium of claim 14, where the network device is associated with the first cellular network; and
where the sending device is associated with a second cellular network,
the second cellular network being different than the first cellular network.

16. The non-transitory computer-readable medium of claim 14, where the one or more instructions, that cause the one or more processors to forward the acknowledgment message, cause the one or more processors to:
receive the acknowledgment message from the recipient device,
the acknowledgment message being formatted based on the second messaging format;
convert the acknowledgment message to the first messaging format; and
provide the acknowledgment message via the SIP over IP interface.

17. The non-transitory computer-readable medium of claim 14, where the sending device is associated with sending user equipment,
the sending device forwarding the message from the sending user equipment, and
the sending device providing the acknowledgment message to the sending user equipment.

18. The non-transitory computer-readable medium of claim 17, where the second cellular network standard is a 3GPP2 cellular network standard; and
where the first cellular network standard is a 3GPP standard.

19. The non-transitory computer-readable medium of claim 14, where the one or more instructions, that cause the one or more processors to provide the message in the second messaging format, cause the one or more processors to:
provide the message via an interface or protocol associated with the second messaging format.

20. The non-transitory computer-readable medium of claim 14, where the one or more instructions, that cause the one or more processors to receive the message, cause the one or more processors to:
receive a time stamp in association with the message,
the time stamp identifying a time at which the message was generated or transmitted; and
where the one or more instructions, that cause the one or more processors to forward the acknowledgment message, cause the one or more processors to:
forward the acknowledgment message in association with the time stamp,
the time stamp permitting the sending device to identify sending user equipment from which the sending device received the message.

* * * * *